United States Patent
Bi et al.

(10) Patent No.: US 7,006,842 B2
(45) Date of Patent: Feb. 28, 2006

(54) COMMUNICATION SYSTEM TRANSMIT POWER CONTROL METHOD

(75) Inventors: Hao Bi, Wheeling, IL (US); Robert T. Love, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 763 days.

(21) Appl. No.: 09/774,383

(22) Filed: Jan. 30, 2001

(65) Prior Publication Data

US 2001/0033553 A1    Oct. 25, 2001

Related U.S. Application Data

(60) Provisional application No. 60/179,911, filed on Feb. 3, 2000.

(51) Int. Cl.
*H04B 7/185* (2006.01)

(52) U.S. Cl. .................. 455/522; 455/69; 370/318; 370/335; 370/342; 370/328

(58) Field of Classification Search .............. 455/522, 455/134, 68, 69, 135, 226.1, 226.3, 133; 370/318, 320, 332, 333, 342, 328, 335
See application file for complete search history.

(56) References Cited

U.S. PATENT DOCUMENTS

| | | | |
|---|---|---|---|
| 6,084,904 A | 7/2000 | Wang et al. | 375/130 |
| 6,137,840 A | 10/2000 | Tiedemann, Jr. et al. | 375/297 |
| 6,151,508 A | 11/2000 | Kim et al. | 455/522 |
| 6,181,738 B1 | 1/2001 | Chheda et al. | 375/224 |
| 6,449,463 B1 * | 9/2002 | Schiff | 455/69 |
| 6,622,024 B1 * | 9/2003 | Koo et al. | 455/522 |
| 6,690,944 B1 * | 2/2004 | Lee et al. | 455/522 |

FOREIGN PATENT DOCUMENTS

| | | |
|---|---|---|
| KR | 1999-5378 | 1/1999 |
| KR | 1999-51291 | 7/1999 |

* cited by examiner

*Primary Examiner*—Nay Maung
*Assistant Examiner*—Alan T. Gantt
(74) *Attorney, Agent, or Firm*—Lalita W. Pace

(57) ABSTRACT

A method for adjusting an OLT for power control, which is capable of closely tracking a low tFER. The OLT is adjusted based on frame quality indicator FQI and channel quality metrics. FQI and channel quality metrics are generated at the receiver of a base transceiver station after reception of a frame. If FQI equal to a logic zero was generated, the OLT is adjusted upwards using a first stepsize. If FQI equal to a logic one was generated for a certain amount of consecutive frames, the OLT is adjusted downwards using a second stepsize. The OLT is also fine-tuned during the intervals between the transitions caused by applying the first stepsize or second stepsize. The first and second stepsizes and the amount of consecutive frames of FQI=1 before OLT is adjusted downwards are determined adaptively according to time-varying channel conditions and received frame quality indicator.

6 Claims, 10 Drawing Sheets

COMMUNICATION SYSTEM TRANSMIT POWER CONTROL METHOD

REFERENCE(S) TO RELATED APPLICATION(S)

The present application claims priority from provisional application, Ser. No. 60/179,911, entitled "A COMMUNICATION SYSTEM TRANSMIT POWER CONTROL METHOD," filed Feb. 3, 2000, which is commonly owned and incorporated herein by reference in its entirety.

FIELD OF THE INVENTION

The invention relates to the field of communication systems, and more particularly, to a code division multiple access (CDMA) communication system.

BACKGROUND OF THE INVENTION

In a CDMA system, the target frame error rate (tFER) for voice service is 1%, and the tFER for circuit data service can be as low as 0.01%. FIGS. 1, 2 and 3 are plots of the performance of a communication system receiver FER according to a prior art communication system transmit power control method at different doppler frequencies 3 km/hr, 30 km/hr and 120 km/hr, respectively, at a tFER of 0.1%. As can be seen in the Figures, for the given values of outer loop power control threshold (OLT), the received FER does not closely track the tFER. Thus, there is a need for a communication system transmit power control method that provides OLT values that will enable the received FER to more closely track the tFER.

DETAILED DESCRIPTION OF THE PREFERRED EMBODIMENT

The preferred embodiment of the present invention provides a method for adjusting an OLT for power control, which is capable of closely tracking a low tFER. In addition, the preferred embodiment provides a power control method for FER requirements with large dynamic range with consistently good performance using the same algorithm structure and parameter set. The power control method reduces the complexity of system implementation, calibration and maintenance.

In the method, the OLT is adjusted based on frame quality indicator (FQI) and channel quality metrics. FQI and channel quality metrics are generated at the receiver of a base transceiver station after reception of a frame. If FQI equal to a logic zero was generated, the OLT is adjusted upwards using a first stepsize. If FQI equal to a logic one was generated for a certain amount of consecutive frames, the OLT is adjusted downwards using a second stepsize. The OLT is also fine-tuned during the intervals between the transitions caused by applying the first stepsize or second stepsize. The first and second stepsizes and the amount of consecutive frames of FQI=1 before OLT is adjusted downwards are determined adpatively according to time-varying channel conditions and received frame quality indicator.

Figure 1:
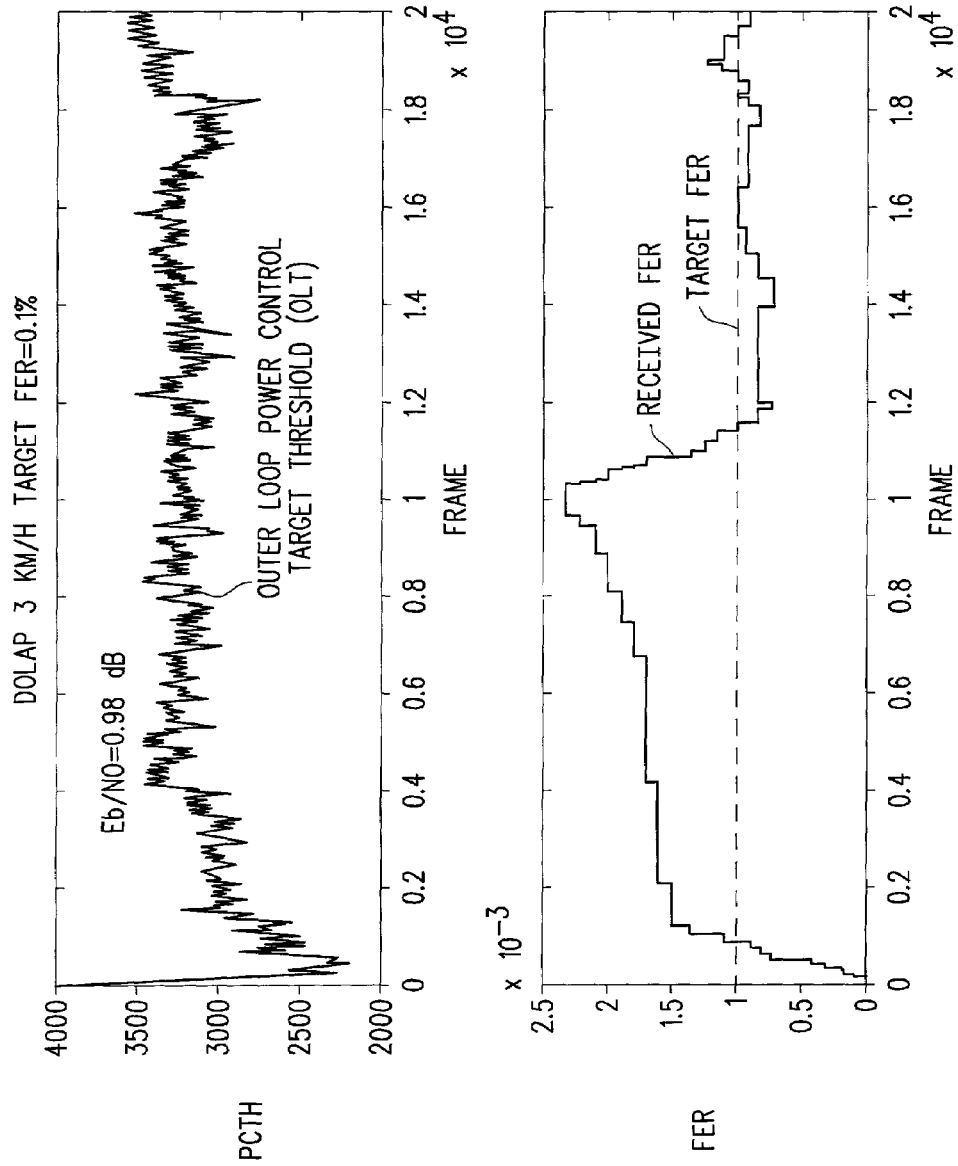
FIG. 1 is a plot illustrating how the received FER tracks a tFER of 0.1% for given values of OLT at a doppler frequency corresponding to 3 km/h according to a prior art communication system transmit power control method.
Figure 2:
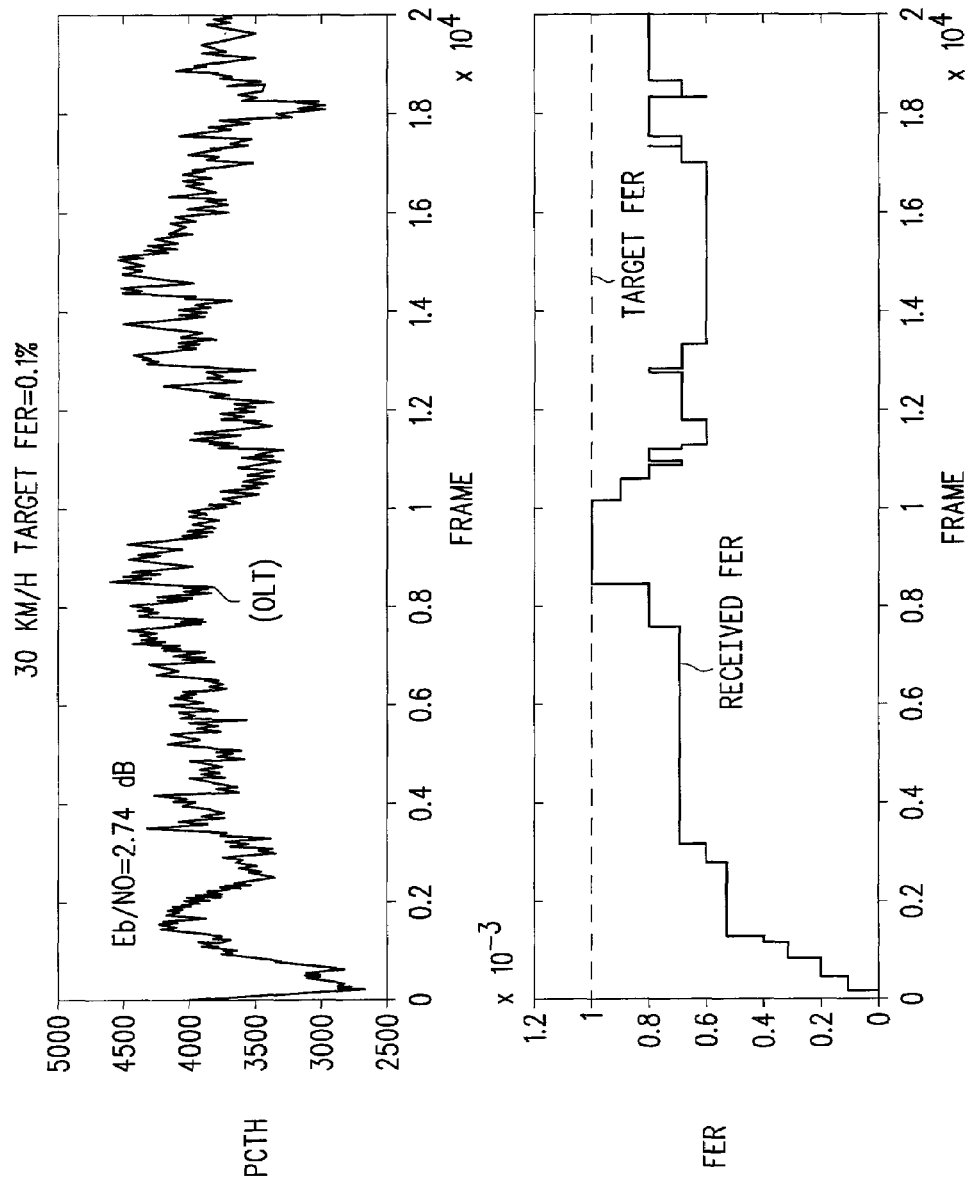
FIG. 2 is a plot illustrating how the received FER tracks a tFER of 0.1% for given values of OLT at a doppler frequency corresponding to 30 km/h according to a prior art communication system transmit power control method.
Figure 3:
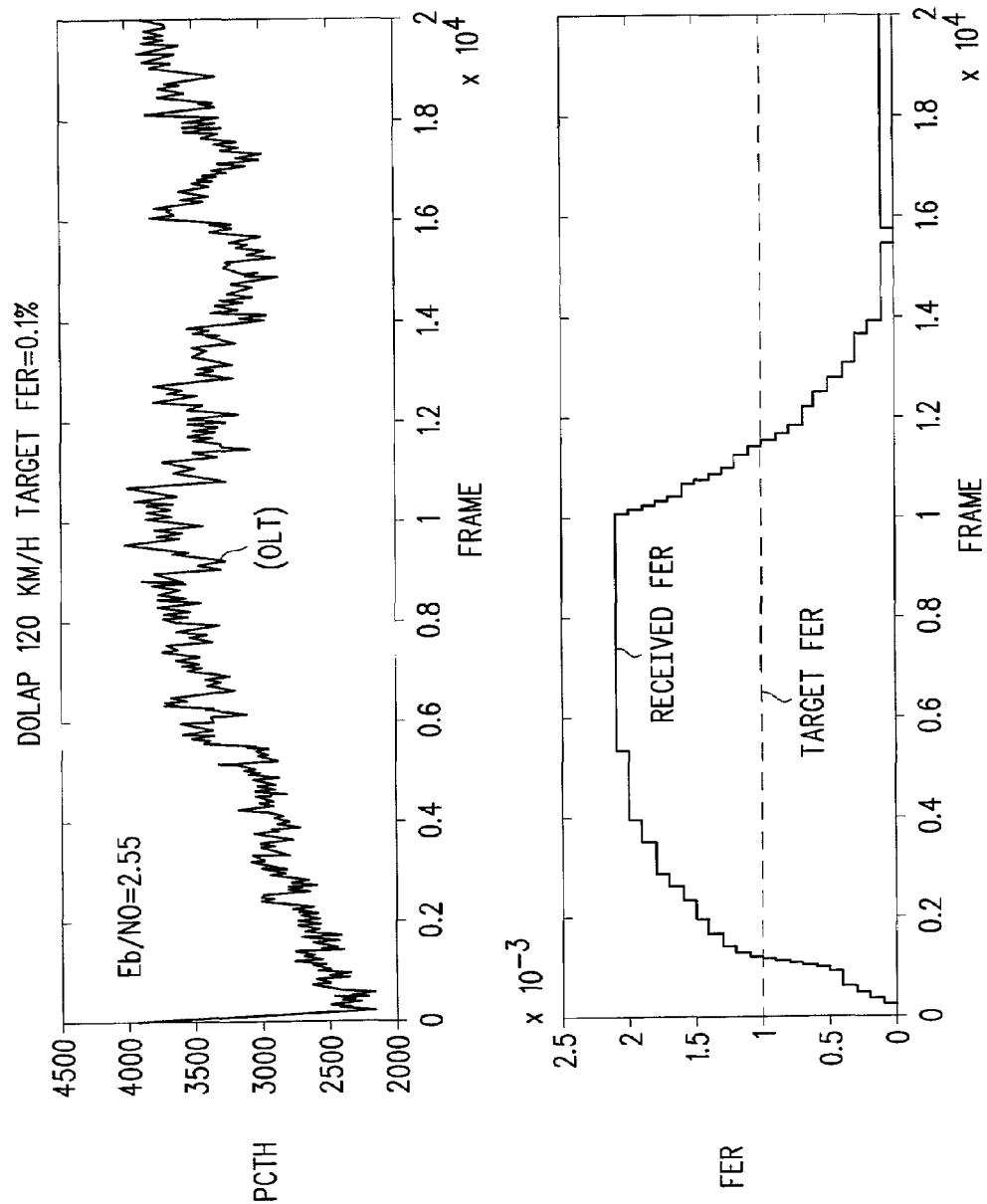
FIG. 3 is a plot illustrating how the received FER tracks a tFER of 0.1% for given values of OLT at a doppler frequency corresponding to 120 km/h according to a prior art communication system transmit power control method.
Figure 4:
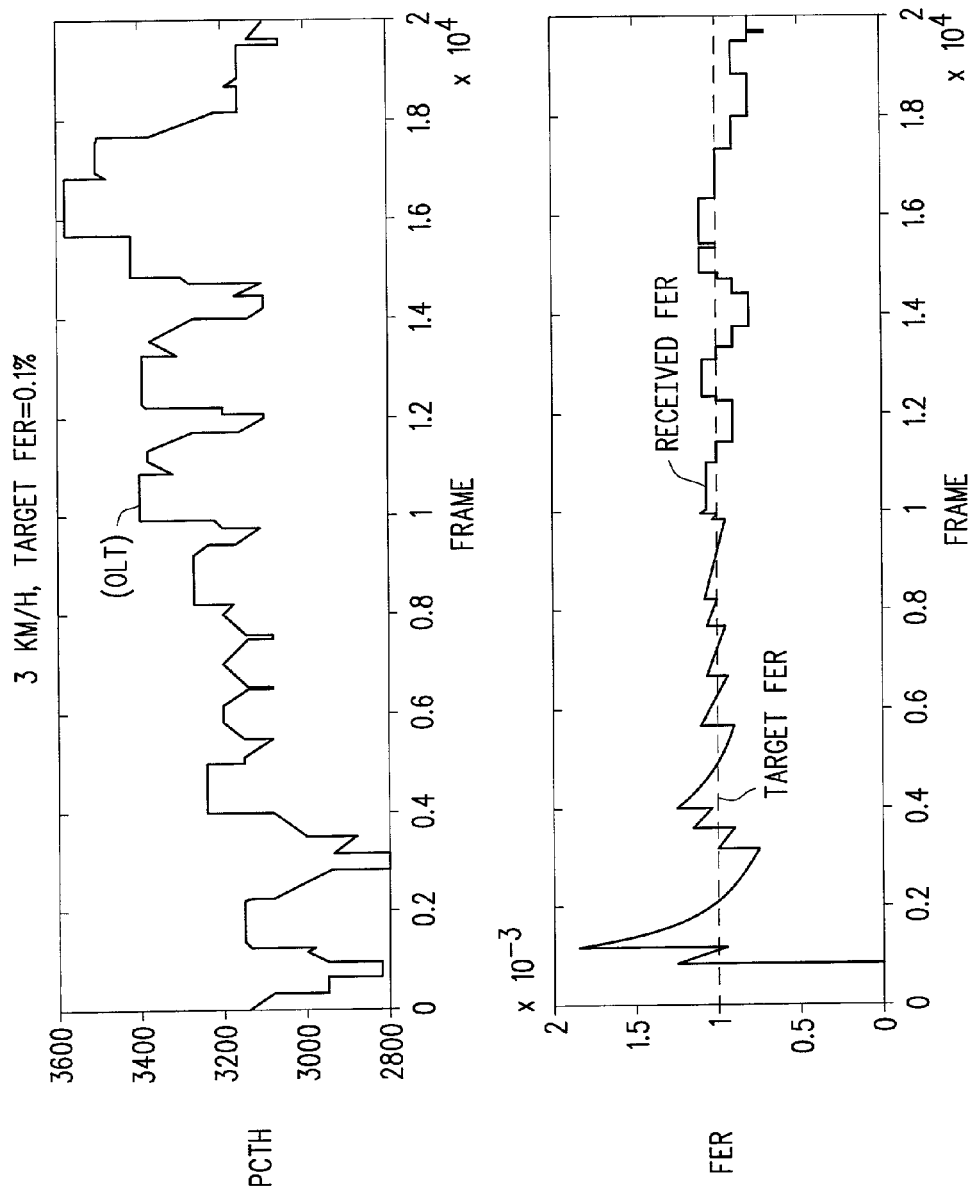
FIG. 4 is a plot illustrating how the received FER tracks a tFER of 0.1% for given values of OLT at a doppler frequency corresponding to 3 km/h according to the communication system transmit power control method of the present invention.
Figure 5:
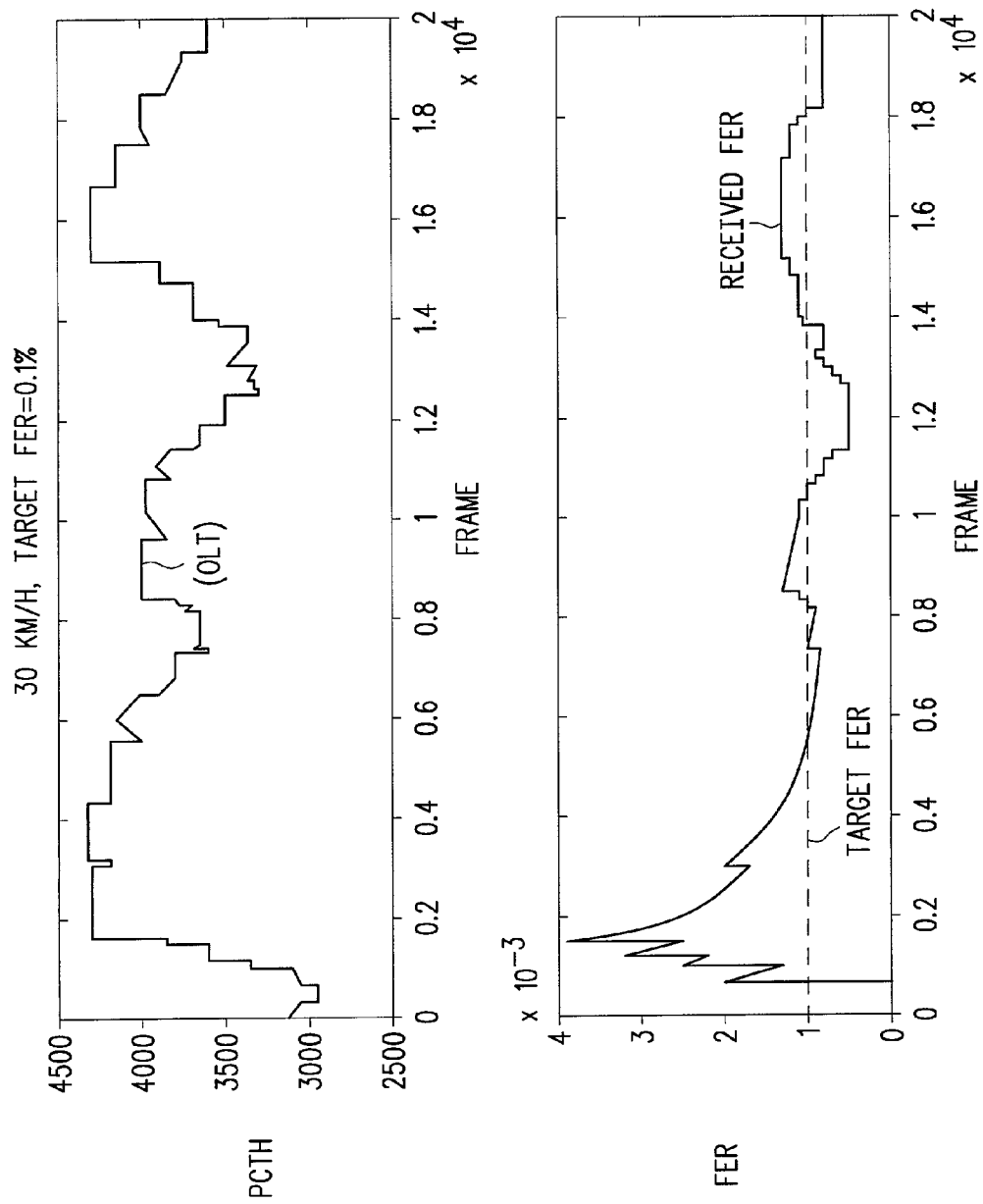
FIG. 5 is a plot illustrating how the received FER tracks a tFER of 0.1% for given values of OLT at a doppler frequency corresponding to 30 km/h according to the communication system transmit power control method of the present invention.
Figure 6:
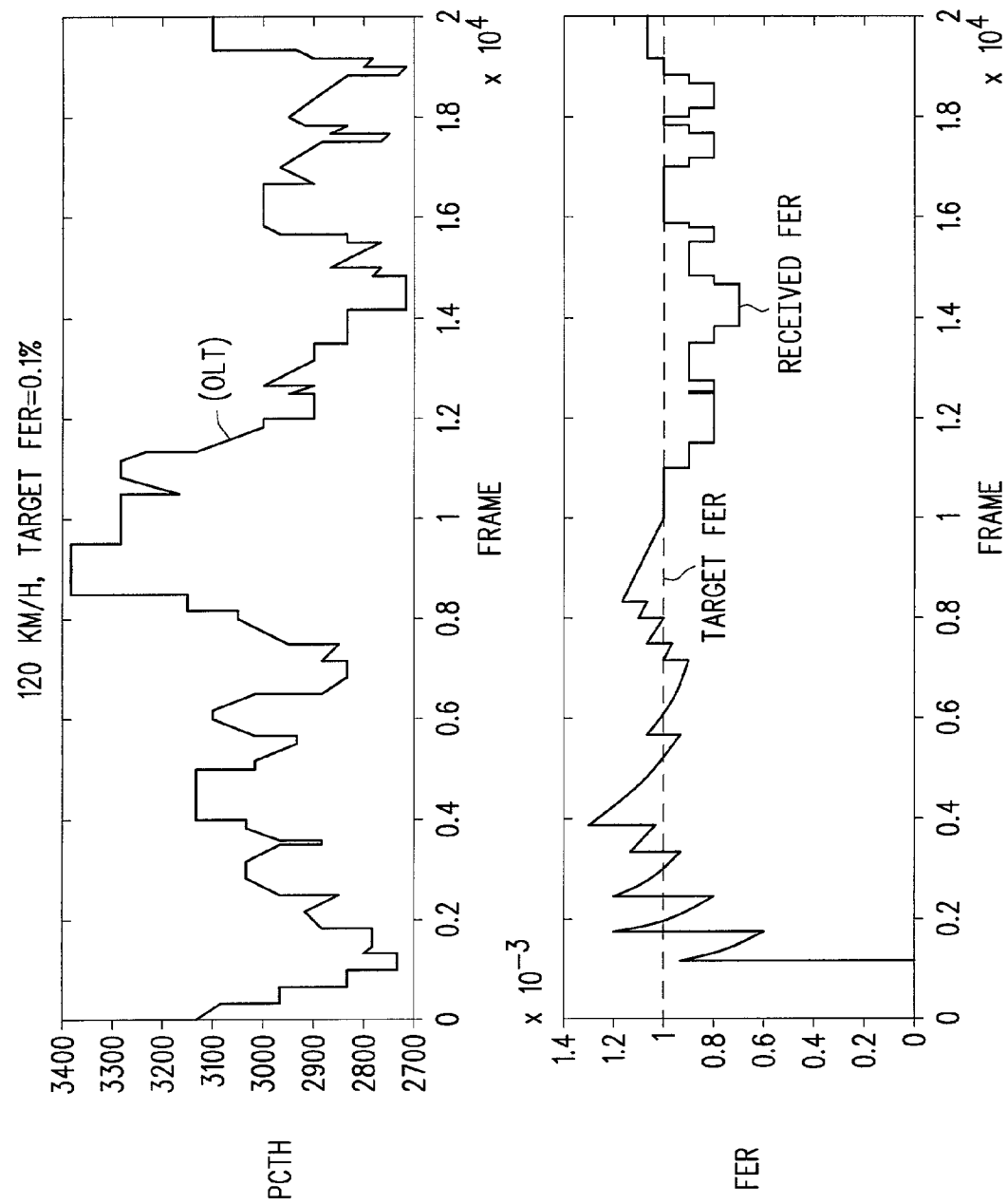
FIG. 6 is a plot illustrating how the received FER tracks a tFER of 0.1% for given values of OLT at a doppler frequency corresponding to 120 km/h according to the communication system transmit power control method of the present invention.
Figure 7:
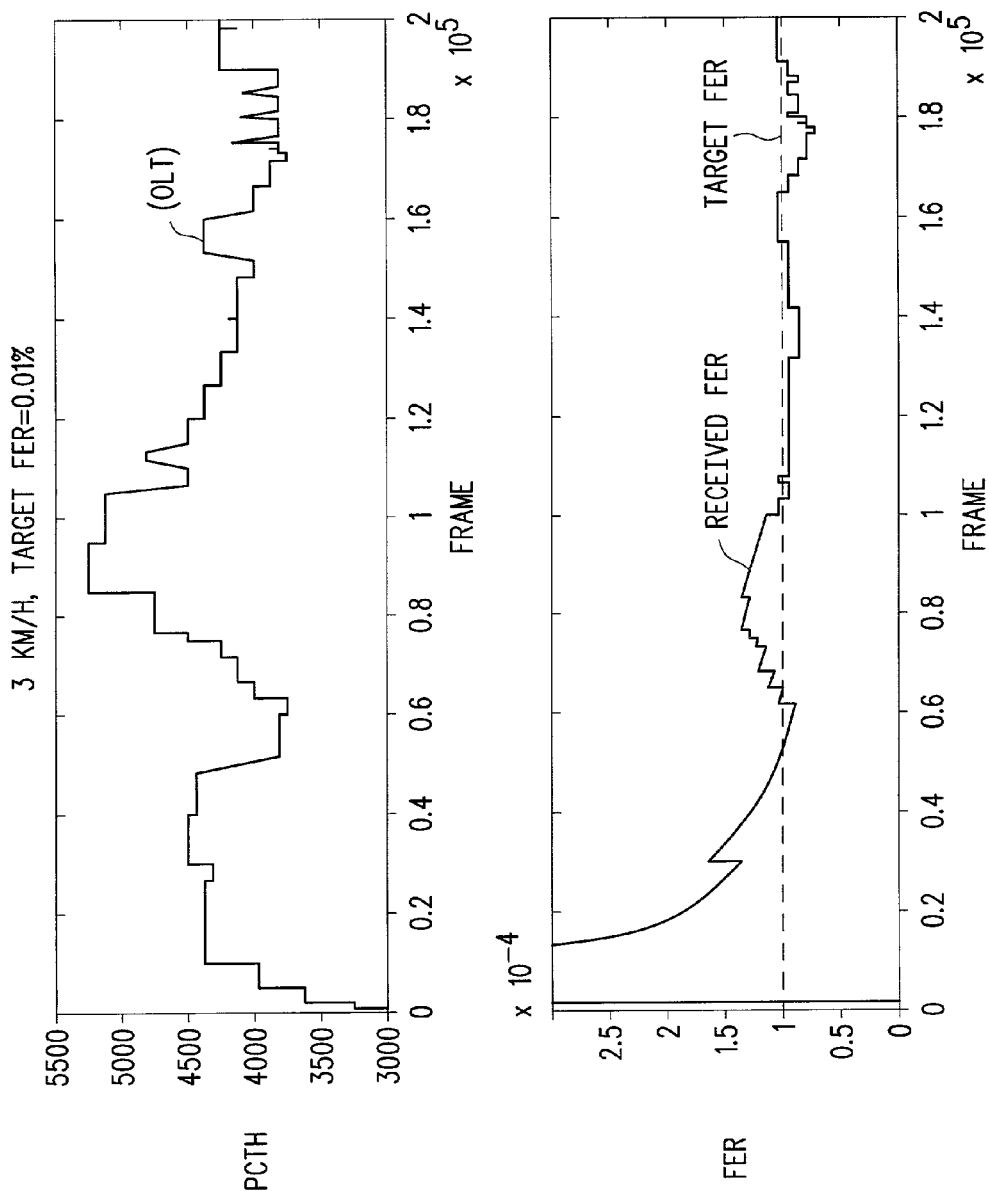
FIG. 7 is a plot illustrating how the received FER tracks a tFER of 0.01% for given values of OLT at a doppler frequency corresponding to 3 km/h according to the communication system transmit power control method of the present invention.
Figure 8:
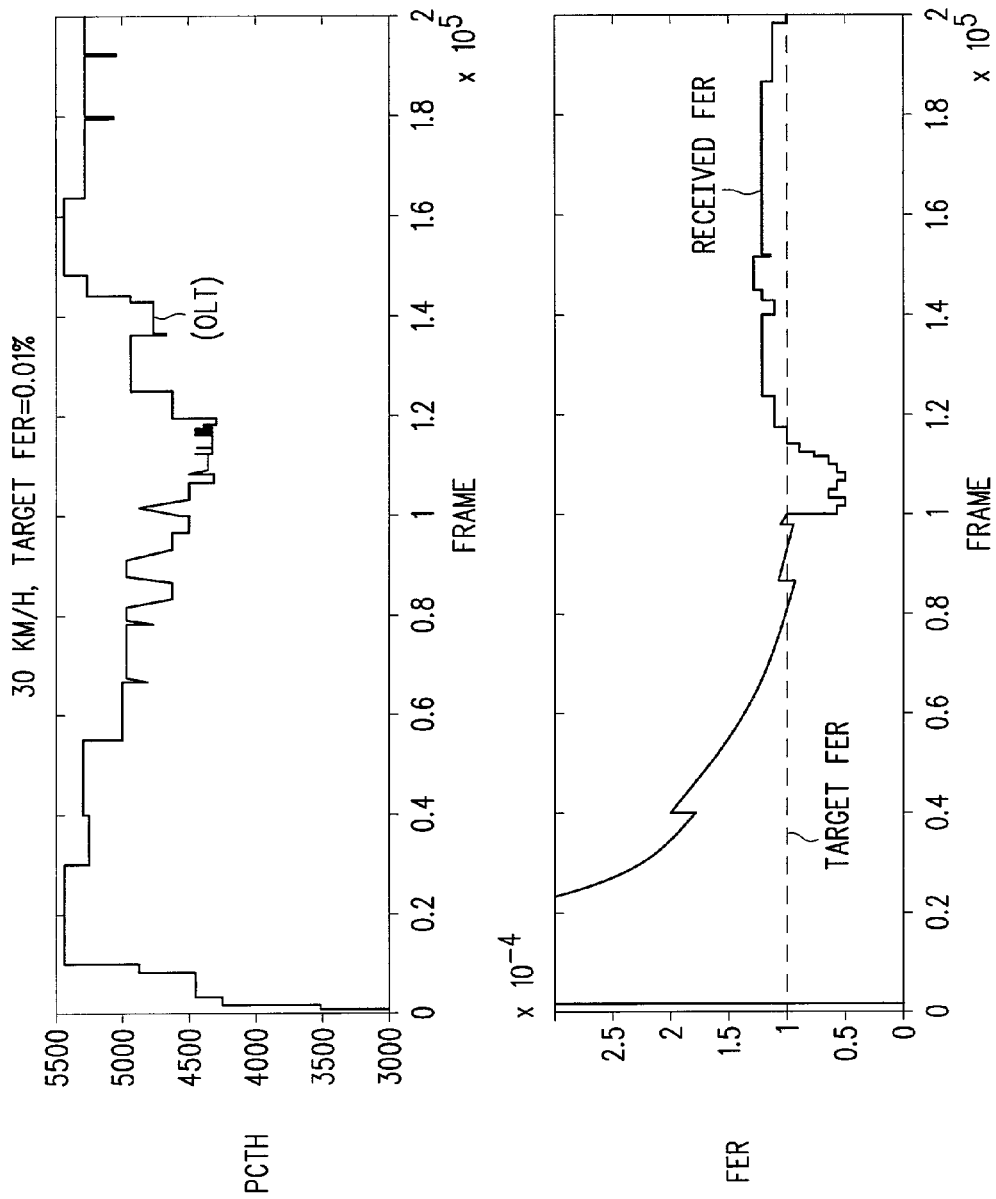
FIG. 8 is a plot illustrating how the received FER tracks a tFER of 0.01% for given values of OLT at a doppler frequency corresponding to 30 km/h according to the communication system transmit power control method of the present invention.
Figure 9:
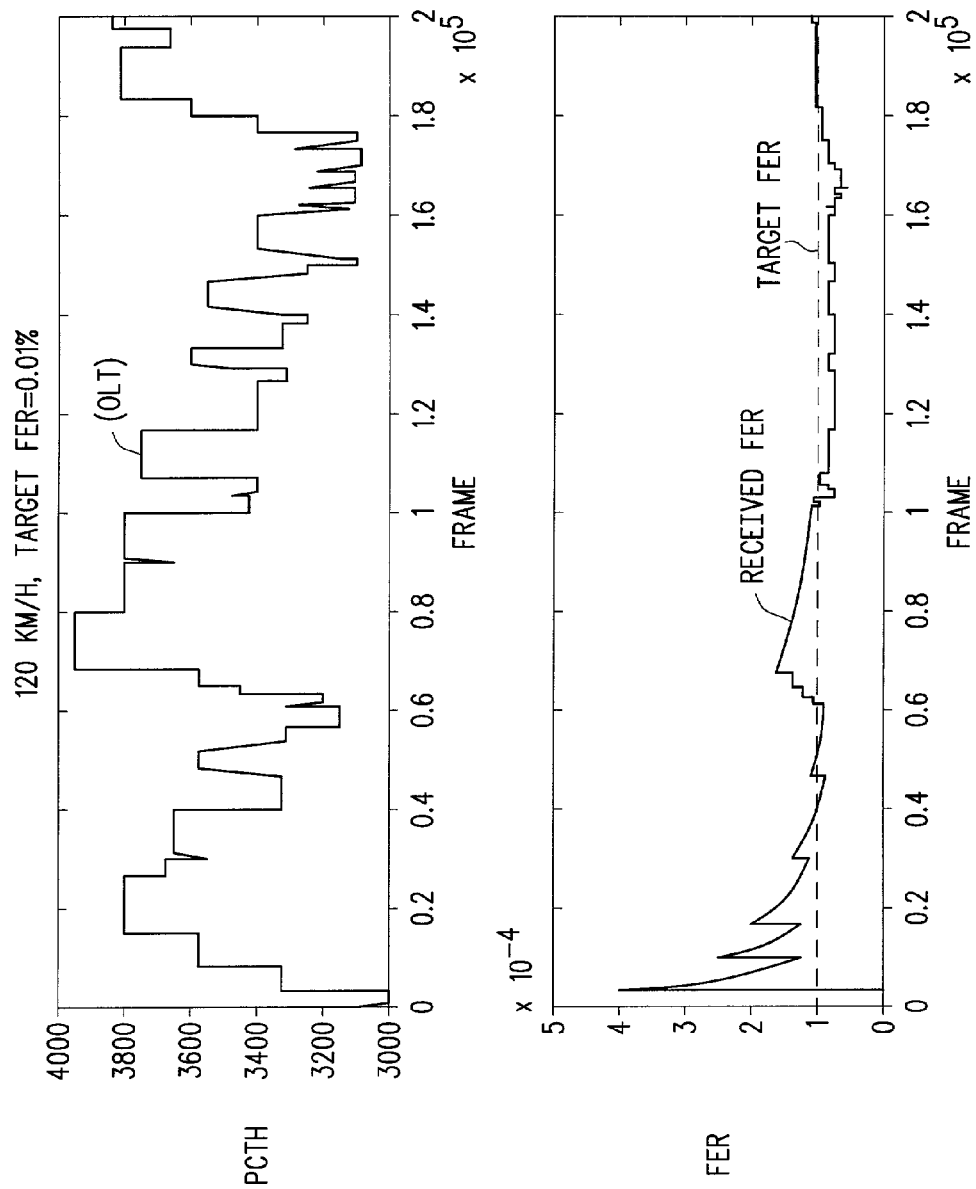
FIG. 9 is a plot illustrating how the received FER tracks a tFER of 0.01% for given values of OLT at a doppler frequency corresponding to 120 km/h according to the communication system transmit power control method of the present invention.

Improved performance of tracking tFER according to the invention is shown in FIGS. 4–9. As shown, a large dynamic range of low FER requirement is provided. Further, as shown in FIGS. 7–9, the method of the present invention produces a received FER that tracks a tFER of 0.01%. Prior art methods have been unable to track such a low tFER.

OLT is used in a communication system receiver as a benchmark of received signal to noise and interference ratio in the generation of power control bits (PCB). PCB are then sent to the mobile station to adjust the transmit power. Fading in the radio channel is thus compensated and a signal to noise and interference ratio is targeted at the receiver. However, this closed loop operation is not perfect in practice due to the delay involved in the generation and transmission of PCB, and due to the unreliable transmission of PCB over radio medium. Therefore, the determination of the OLT needs to account for not only the tFER, but also for the channel conditions of the call.

In the preferred embodiment of the method of the present invention, the OLT is calculated based on frame quality indicator FQI and channel quality metrics. FQI and channel quality metrics are generated at the receiver of a base transceiver station after reception of a frame. FQI carries information relating to whether a frame passes a CRC check (FQI=1) or fails the CRC check (FQI=0). FQI is then used to calculate the received frame error rate (mFER) using a known method. In the preferred embodiment, channel quality metrics can be the ratio of the bit energy to the power spectrum density of noise and interference (Eb/Nt) or its equivalent like channel bit error rate. Preferably, Eb/Nt is measured using the Turbo decoder's soft input and output in the following equation:

$$Eb/Nt = \left(\sum_{i=1}^{N} \text{sgn}(\text{Out}(i)) \cdot \text{In}(i)\right)^2 / \left(\sum_{i=1}^{N} \text{In}(i)^2 - \left(\sum_{i=1}^{N} \text{sgn}(\text{Out}(i)) \cdot \text{In}(i)\right)^2\right). \quad (1)$$

In(i) and Out(i) are soft input and output corresponding to systematic bits; N is the number of systematic bits in a frame; and sgn( ) is a sign function with output 1 when theargument is positive and with output −1 otherwise.

Once FQI, Eb/Nt and mFER are known, the method looks at whether FQI=0 was received. If FQI=0 was received, the OLT is adjusted upwards by a stepsize upDelta as follows:

$$OLT(n)=OLT(n-1)\times\text{upDelta}. \quad (2)$$

If FQI=1 was received for an adaptively determined amount of consecutive frames, "goodDuration," the OLT is adjusted downwards by a stepsize dnDelta as follows:

$$OLT(n)=OLT(n-1)/\text{dnDelta}. \quad (3)$$

In equations (2) and (3) upDelta, dnDelta and goodDuration are not preset constants in the present invention. Rather, they are adaptively determined based on channel conditions and the mFER. In this manner, the tFER can be tracked with economic use of the transmit power, since the process of adjusting transmit power takes into account the degree of fading of a time-varying channel. One way of quantifying the fading condition is by measuring the minimum and average of Eb/Nt, minEbNt and avgEbNt, over a certain amount of frames (16 frame moving average). The degree of fading can be indicated using the ratio between the minEbNt and the avgEbNt and the current Eb/Nt. The stepsizes upDelta and dnDelta used in adjusting the OLT in equations (2) and (3) can then be determined using these measurements to allow an appropriate margin of transmit power to combat a current fading situation. For example, upDelta, the stepsize used to increase OLT, can be chosen to be proportional to the ratio of the current Eb/Nt over the average Eb/Nt as follow:

$$\text{upDelta}=\text{baseUpDelta}\cdot EbNt/\text{avg}EbNt. \quad (4)$$

The equation takes advantage of the fact that deeper fadings occur less frequently. dnDelta, the stepsize used to reduce the OLT after receiving "goodDuration" consecutive good frames, can be similarly chosen proportional to the ratio of the average Eb/Nt over the minimum Eb/Nt as follows:

$$\text{dnDelta}=\text{baseDnDelta}\cdot\text{avg}EbNt/\text{min}EbNt. \quad (5)$$

baseUpDelta and baseDnDelta are scaling units. The baseUpDelta and baseDnDelta may be predetermined. The value of goodDuration is determined based on the comparison of mFER to tFER as follows:

$$\text{goodDuration}=mFER/tFER^2. \quad (6)$$

Returning to the method, if FQI=0 was received, upDelta is calculated using equation (4) and then used to adjust the OLT upwards in equation (2). If instead, FQI= 1 was received for "goodDuration" consecutive frames, downDelta is caluclated using equation (5) and then used to adjust the OLT downwards in equation (3).

The OLT is also fine-tuned by a predetermined constant, "floatDelta," during the intervals between the transitions caused by applying upDelta or dnDelta. Let fadeDepth(i) denote the ratio of avgEbNt/minEbNt measured continuously with a time interval of a certain amount of frames m, then every m frames:

$$OLT(i)=OLT(i-1)\cdot\text{floatDelta, when fadeDepth}(i)>\text{fadeDepth}(i-1) \quad (7)$$

and $$OLT(i)=OLT(i-1)/\text{floatDelta, when fadeDepth}(i)<\text{fadeDepth}(i-1) \quad (8)$$

The term fadeDepth quantifies the fading condition; the larger the value, the deeper the fading. FadeDepth (i) denotes the current measurement of the fading; fadeDepth (i−1) denotes the previous measurement of the fading. With this fine-tuning, the process of adjusting transmit power can react to the small fluctuations of fading timely and conservatively.

Figure 10:
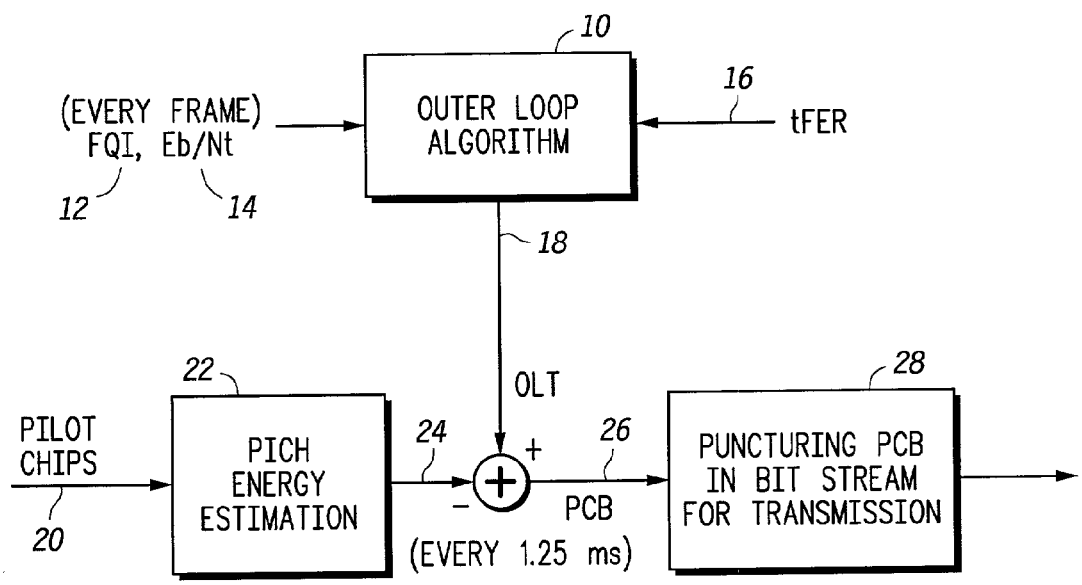
FIG. 10 is a functional block diagram of the transmit power control method of the present invention.

FIG. 10 is a functional block diagram of the transmit power control method 10 of the present invention. As described above, the method receives the FQI 12, Eb/Nt 14 and tFER 16 and calulates an OLT 18. The OLT 18 is compared with a chip energy to power spectrum density of noise and interference quanitity, Ec/Io, 24 generated by a PICH Energy Estimation block 22 using pilot chips 20. The output of the comparison is the power control bit (PCB) 26. If the Ec/Io is greater than the OLT 18, the PCB 28 is set equal to 1 and sent by block 28 to the mobile stations to decrease the transmit power. If the Ec/Io is less than the OLT 18, the PCB 28 is set equal 0 and sent to the mobile stations to increase the transmit power.

Those skilled in the art will recognize that various modifications and variations can be made in the method of the present invention without departing from the scope or spirit of this invention. The invention may be implemented in a CDMA system operating according to any of the known standards such as 2G and 3G CDMA standards (IS-95A, B and IS-2000, 3GPP WCDMA).

What is claimed is:

1. In a communication system receiver, a method of adjusting an outer loop threshold (OLT) for power control comprising:
   obtaining a frame quality indicator; and
   obtaining a channel quality metric Eb/Nt;
   wherein when the frame quality indicator is equal to a logic zero,
      obtaining an average Eb/Nt (avgEbNt); and
      using Eb/Nt and avgEbNt to calculate a stepsize used to increase the OLT; wherein the stepsize is calculated using upDelta=baseUpDelta*(Eb/Nt)/avgEbNt and wherein baseUpDelta is a predetermined scaling factor.

2. The method of claim 1 wherein the OLT is increased using the equation OLT(n)=OLT(n−1)×upDelta.

3. The method of claim 1 wherein the channel quality metric Eb/Nt is calculated using the equation $$Eb/Nt = \left(\sum_{i=1}^{N} \text{sgn}(\text{Out}(i)) \cdot \text{In}(i)\right)^2 / \left(\sum_{i=1}^{N} \text{In}(i)^2 - \left(\sum_{i=1}^{N} \text{sgn}(\text{Out}(i)) \cdot \text{In}(i)\right)^2\right).$$

4. In a communication system receiver having a target frame error rate (tFER), a method of adjusting an outer loop threshold (OLT) for power control comprising:

obtaining a frame quality indicator;

wherein when the frame quality indicator is not equal to a logic zero and the frame quality indicator is not equal to a logic one for an adaptively determined amount of consecutive frames, adjusting the OLT according to a comparison of a fadeDepth(i) and a fadeDepth(i−1).

5. The method of claim 4 wherein the OLT is adjusted using the equation OLT(i)=OLT(i−1)*floatDelta, when fadeDepth(i)>fadeDepth(i−1); wherein floatDelta is a predefined constant.

6. The method of claim 4 wherein the OLT is adjusted using the equation OLT(i)=OLT(i−1)/floatDelta, when fadeDepth(i)<fadeDepth(i−1); wherein floatDelta is a predefined constant.

* * * * *